(12) United States Patent
Fuwa et al.

(10) Patent No.: US 8,000,925 B2
(45) Date of Patent: Aug. 16, 2011

(54) MOVING BODY WITH TILT ANGLE ESTIMATING MECHANISM

(75) Inventors: Toshio Fuwa, Nisshin (JP); Issei Nakashima, Brussels (BE)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 167 days.

(21) Appl. No.: 12/297,323

(22) PCT Filed: Sep. 27, 2007

(86) PCT No.: PCT/JP2007/069404
§ 371 (c)(1),
(2), (4) Date: Oct. 16, 2008

(87) PCT Pub. No.: WO2008/041732
PCT Pub. Date: Apr. 10, 2008

(65) Prior Publication Data
US 2009/0138232 A1    May 28, 2009

(30) Foreign Application Priority Data
Oct. 5, 2006  (JP) .................................. 2006-273622

(51) Int. Cl.
*G01C 9/00*   (2006.01)
(52) U.S. Cl. ...................................................... 702/154
(58) Field of Classification Search ........... 702/150–154
See application file for complete search history.

(56) References Cited

U.S. PATENT DOCUMENTS 6,581,714 B1 * 6/2003 Kamen et al. ................. 180/333
6,678,631 B2 * 1/2004 Schiffmann ................... 702/151

FOREIGN PATENT DOCUMENTS

| JP | 03-186417 | | 8/1991 |
| JP | 04-346021 | | 12/1992 |
| JP | 2002-318274 | A | 10/2002 |
| JP | 2004-295430 | | 10/2004 |
| JP | 2040-500271 | A | 1/2005 |
| JP | 2006-220490 | A | 8/2006 |
| WO | WO 2005/063536 | A1 | 7/2005 |

OTHER PUBLICATIONS

"observer", Academic Press Dictionary of Science and Technology, 1996.*

* cited by examiner

*Primary Examiner* — Drew A Dunn
*Assistant Examiner* — Stephen Cherry
(74) *Attorney, Agent, or Firm* — Kenyon & Kenyon LLP

(57) ABSTRACT

A moving body with a tilt angle estimating mechanism capable of estimating a tilt angle of a vehicle body with high accuracy. The moving body includes: an acceleration sensor for detecting an acceleration in two axial directions; a gyro sensor for detecting an angular velocity of a vehicle body; and a tilt angle estimating mechanism for estimating a tilt angle of the vehicle body. The tilt angle estimating mechanism includes: a device for estimating a tilt angle in response to the acceleration sensor based on the acceleration detected by the acceleration sensor; a device for estimating a second tilt angle based on the angular velocity detected by the gyro sensor; and a device for estimating a tilt angle with a linear model equation of the moving body being regarded as an observer, in accordance with the tilt angle based on the acceleration sensor and the tilt angle based on the gyro sensor.

6 Claims, 4 Drawing Sheets

MOVING BODY WITH TILT ANGLE ESTIMATING MECHANISM

This is a 371 national phase application of PCT/JP2007/069404 filed 27 Sep. 2007, claiming priority to Japanese Patent Application No. JP 2006-273622 filed 5 Oct. 2006, the contents of which are incorporated herein by reference.

TECHNICAL FIELD

The present invention relates to a moving body with a tilt angle estimating mechanism, and more particularly, to an inverted two-wheeled vehicle with a tilt angle estimating mechanism.

BACKGROUND ART

For a moving body such as an inverted two-wheeled vehicle, it is necessary to estimate a tilt angle with high accuracy in order to maintain an inverted posture. Not only for the two-wheeled type vehicle but also for a walking type moving body or a caterpillar-driven moving body, the estimation of the tilt angle with high accuracy is required.

Conventionally, mechanisms for estimating a tilt angle include a system using a gyro (angular velocity) sensor and a system using an acceleration sensor. In the system using a gyro sensor, a tilt angle is obtained by integrating an output signal of the gyro sensor. However, an offset noise is originally superimposed on the output signal of the gyro sensor, so there is a problem in that a deviation from a true value is gradually increased.

In the system using an acceleration sensor, the tilt angle is calculated using a geometric relation obtained by a two or more axial acceleration sensor. According to the system, the tilt angle is calculated from values of a biaxial gravity acceleration, so there is a problem in that the estimation accuracy is degraded unless the estimation is carried out in a static state. In particular, when the moving body is accelerated/decelerated, a component generated by the acceleration/deceleration is superimposed as noise on the biaxial acceleration sensor.

Further, there is also proposed a system for estimating a tilt angle by an autonomous inertia navigation system (INS) using a gyro sensor and a triaxial acceleration sensor. However, the problem of the offset noise in the gyro sensor and the problem of the noise caused by the acceleration/deceleration of the acceleration sensor as described above are still unsolved.

Note that Patent Document 1 discloses a technique for using a gyro sensor and an accelerometer to be switched for each frequency band. However, the technique is not relevant to the moving body with a tilt angle estimating mechanism.
[Patent Document 1] Japanese Unexamined Patent Application Publication No. 4-346021

DISCLOSURE OF THE INVENTION

Problems to be Solved by the Invention

As described above, the use of a gyro sensor or an acceleration sensor enables obtainment of a tilt angle of a vehicle body, but the accuracy thereof is a problem.

The present invention has been made to solve the above-mentioned problem, and it is an object of the present invention to provide a moving body with a tilt angle estimating mechanism capable of estimating a tilt angle of a vehicle body with high accuracy.

Means for Solving the Problems

A moving body according to the present invention includes: an acceleration sensor for detecting an acceleration in two axial directions; a gyro sensor for detecting an angular velocity of a vehicle body; and a tilt angle estimating mechanism for estimating a tilt angle of the vehicle body, in which the tilt angle estimating mechanism includes: means for estimating a first tilt angle based on the acceleration detected by the acceleration sensor; means for estimating a second tilt angle based on the angular velocity detected by the gyro sensor according to a linear model equation of the moving body; and means for estimating a tilt angle by executing feedback control so that the second tilt angle follows the first tilt angle with the first tilt angle being set as a reference value for an observer.

Here, it is desirable that the tilt angle estimating mechanism include setting means for setting an observer gain K for adjusting the effect of the first tilt angle, to an arbitrary value.

Further, the setting means may set the observer gain K to a small value when the moving body is in a longitudinal acceleration state.

In addition, it is desirable that the setting means set the observer gain K according to a failure condition of each of the acceleration sensor and the gyro sensor.

Further, a low-pass filter may be provided in a subsequent stage of the acceleration sensor.

A moving body according to a preferred embodiment of the present invention is an inverted two-wheeled vehicle.

Advantageous Effects of the Invention

According to the present invention, it is possible to provide a moving body with a tilt angle estimating mechanism capable of estimating a tilt angle of a vehicle body with high accuracy.

DESCRIPTION OF REFERENCE NUMERALS

1 VEHICLE BODY
2 WHEEL
10 MOVING BODY

BEST MODES FOR CARRYING OUT THE INVENTION

Figure 1:
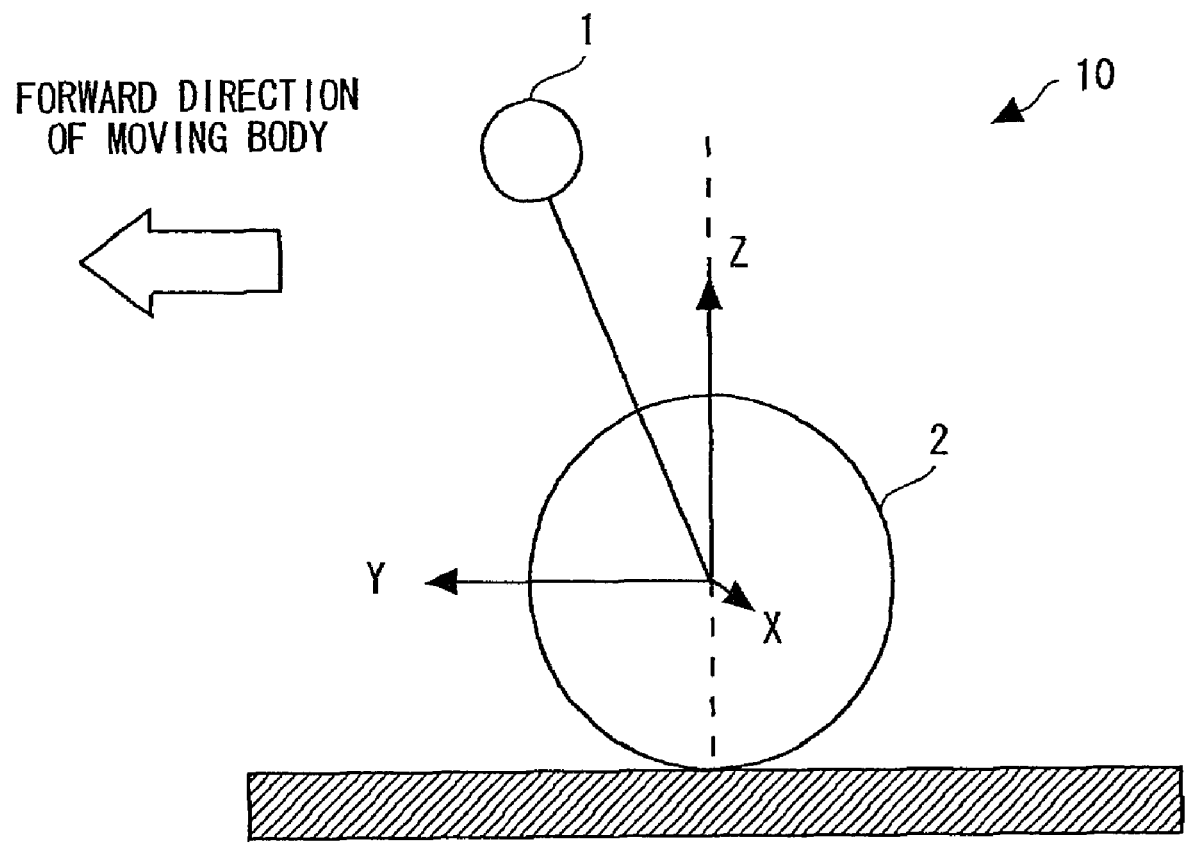
FIG. 1 is a diagram for explaining a sensor coordinate system of a moving body according to an embodiment of the present invention.

FIG. 1 shows a sensor coordinate system of a moving body with a tilt angle estimating mechanism according to the present invention. As shown in FIG. 1, the moving body 10 includes a vehicle body 1 and a wheel 2 fixed to the vehicle body 1 through a drive mechanism which is not shown.

An axis which is orthogonal to a forward direction (that is, moving direction, pitch direction) of the moving body 10 and which extends in a substantially horizontal direction (that is, rolling direction) is set as an X-axis, the forward direction (that is, moving direction, pitch direction) of the moving body 10 is set as a Y-axis, and a vertical direction thereof is set as a Z-axis. In this example, an angle formed between a line connecting the vehicle body 1 and a rotation center of the wheel 2, and the Z-axis is set as a tilt angle of a vehicle body.

The moving body 10 includes an acceleration sensor for measuring accelerations in a Y-axis direction and a Z-axis direction, and a low-pass filter which is provided in a subsequent stage thereof and which has a low cutoff frequency. Based on accelerations u(1) and u(2) which are detected in the Y-axis direction and the Z-axis direction, respectively, by those two acceleration sensors, a tilt angle of a vehicle body (that is, pitch angle) $\eta$ can be obtained according to the following equation.

$$\eta = \tan^{-1}(u(1)/u(2)) \tag{1}$$

Further, the moving body 10 includes a single-axis gyro sensor (angular velocity sensor) for measuring an angular velocity in an X-axis direction. Furthermore, in the moving body 10, a tilt angle estimating mechanism for inputting a detection signal of each of the acceleration sensor and the gyro sensor and a control signal to estimate (calculate) the tilt angle of the vehicle body is implemented by a computer.

The tilt angle estimating mechanism includes: means for estimating a tilt angle based on the acceleration detected by the acceleration sensor; means for estimating a tilt angle based on the angular velocity detected by the gyro sensor; and means for estimating a tilt angle in accordance with the tilt angle based on the acceleration sensor and the tilt angle based on the gyro sensor, with a linear model equation of the moving body being regarded as an observer. In this case, the means for estimating the tilt angle performs estimation by setting the tilt angle based on the gyro sensor as a reference value for the observer and by performing feedback so that an estimated value follows the tilt angle based on the gyro sensor.

Figure 2:
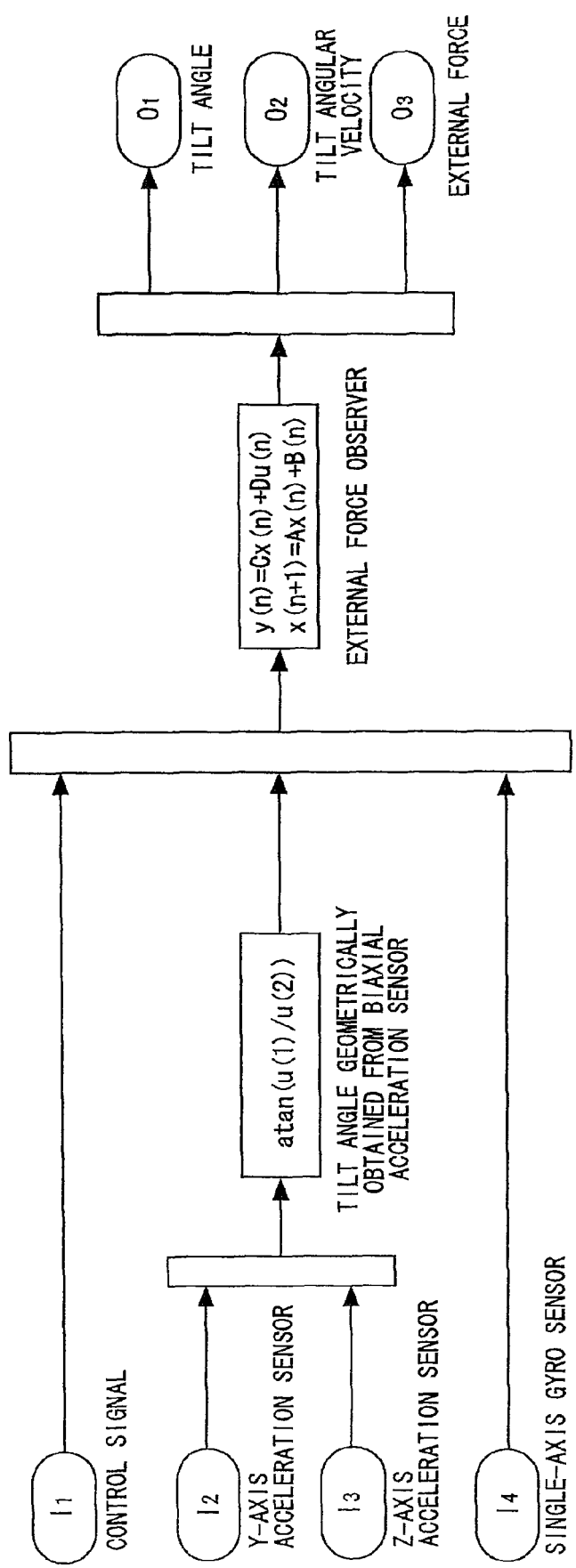
FIG. 2 is a block diagram showing a method of estimating a tilt angle of a moving body according to the embodiment of the present invention.

FIG. 2 is a block diagram for explaining processing for estimating a tilt angle according to the present invention. As shown in the figure, a control signal is input to $I_1$, an acceleration signal detected in the Y-axis direction by an Y-axis acceleration sensor is input to $I_2$, an acceleration signal detected in the Z-axis direction by a Z-axis acceleration sensor is input to $I_3$, and an angular velocity signal detected by the single-axis gyro sensor is input to $I_4$.

First, based on the acceleration in the Y-axis direction, which is input to $I_2$, and based on the acceleration in the Z-axis direction, which is input to $I_3$, a tilt angle of a vehicle body is geometrically calculated according to the above Equation (1). The accuracy of the tilt angle calculated here is high with respect to a direct current (DC) component to a low frequency range but is low with respect to a medium to high frequency range because disturbance is applied to the acceleration sensor during a motion involving acceleration/deceleration.

Next, the control signal, the calculated tilt angle of the vehicle body, and the angular velocity detected by the gyro sensor are input. Further, feedback processing is performed by an external force observer to ultimately calculate a tilt angle, a tilt angular velocity, and an external force to be output from $O_1$, $O_2$, and $O_3$, respectively. Note that, in FIG. 2, an equation regarding the external force observer, $y(n)=Cx(n)+Du(n)$, is defined as Equation (2), and $x(n+1)=Ax(n)+Bu(n)$ is defined as Equation (3).

Next, details of design of the external force observer are described.

First, linear modeling for the tilt angle of the vehicle body is executed. A vehicle body model (equation of motion) of an inverted two-wheel vehicle can be expressed by the following equation:

$$(m_1 l^2 + J_1 + n^2 J_m)\ddot{\eta} + (m_1 rl - n^2 J_m)\ddot{\theta} - m_1 gl\eta + f_r(\dot{\eta} - \dot{\theta}) = -nu \tag{4}$$

$$(m_1 rl - n^2 J_m)\ddot{\eta} + \{(m_1 + m_2)r^2 + J_w + n^2 J_m\}\ddot{\theta} + f_r(\dot{\theta} - \dot{\eta}) = nu \tag{5}$$

where $\eta$ represents a tilt angle of a vehicle body; $\theta$: a rotation angle of a wheel; $m_1$: a mass of a vehicle body; $m_2$: a mass of a wheel; l: a distance between a center of gravity of a vehicle body and an axle; $J_1$: an inertia moment about a center of gravity of a vehicle body; Jm: an inertia moment of a motor rotor; Jw: an inertia moment about a rotation axis of a wheel; n: a gear ratio (motor:wheel=1:n); r: a wheel radius; fr: a resistance of a drive system; and u: a torque value of a motor.

Of the above Equations (4) and (5), only Equation (4) is taken into consideration because it is only necessary to carry out estimation of the tilt angle $\eta$ of the vehicle body in the present invention. Note that Equation (5) is used for obtaining a tilt angular velocity. When the left-hand side of Equation (4) is expressed using "$\eta$", Equation (6) is obtained as follows.

$$(m_1 l^2 + J_1 + n^2 J_m)\ddot{\eta} + f_r \dot{\eta} - m_1 gl\eta = -nu - (m_1 rl - n^2 J_m)\ddot{\theta} + f_r \dot{\theta} \tag{6}$$

The external force observer is created using Equation (6) as a basic model. Here, a $\theta$ term in the right-hand side of Equation (6) functions as an external force of the $\eta$ equation. In the present invention, when the $\theta$ term is neglected, the estimation error is increased. Accordingly, in order to prevent the estimation error, the external force observer is constructed in consideration of an external force f as a state quantity.

Next, derivation of the basic model for the external force observer is described. Now, the state quantity is defined by the following Equation (7):

$$X = \begin{bmatrix} \eta \\ \dot{\eta} \\ f \end{bmatrix} \tag{7}$$

where f represents an external force.

When Equation (6) is changed to a state equation representation by using the state quantity represented in Equation (7), Equations (8) and (9) are obtained as follows:

$$\dot{X} = AX + Bu \tag{8}$$

$$Y = CX \tag{9}$$

$$A = \begin{bmatrix} 0 & 1 & 0 \\ m_1 gl/M & -f_r/M & 1/M \\ 0 & 0 & 0 \end{bmatrix}$$

$$B = \begin{bmatrix} 0 \\ -n/M \\ 0 \end{bmatrix}$$

$$C = \begin{bmatrix} 1 & 0 & 0 \\ 0 & 1 & 0 \end{bmatrix}$$

$$M = m_1 l^2 + J_1 + n^2 J_m$$

where the external force f is set in a stepwise manner so as to obtain a constant value in a sample period, and a derivative value obtained in the period is set to 0.

Next, a description is given of a method of determining a gain of the external force observer.

The external force observer can be expressed by the following Equation (10).

$$A\hat{P}\hat{X} = A\hat{X} + Bu + K(Y - C\hat{X}) \quad (10)$$

$\hat{X}$: estimated value
K: observer gain

The observer gain (feedback gain) K represented in Equation (10) is set as K1, K2, and K3 for each of a state quantity η, a η dot, and f. According to the magnitude of the observer gain K represented in Equation (10), an estimated convergence rate is determined. That is, according to the magnitude of a pole of the characteristic equation obtained from Equation (10), the estimated convergence rate is determined.

Assuming that K=(K1, K2, K3), when K1 is large, the estimated convergence rate approaches an estimated value obtained by the acceleration sensor, and when K2 is large, the estimated convergence rate approaches an estimated value obtained by the gyro sensor. At low frequencies, it is determined that the estimated value obtained by the acceleration sensor is correct, so K2 is made large. At medium to high frequencies, K2 is made large. If an operating frequency can be estimated in advance, K is set according to the frequency.

Specifically, K is determined by considering a trade-off between the following cases (A) and (B).

(A) A Case where the Observer Gain K is Large (Pole is Far from Real Axis)

In this case, the effect of an observable which is an input of the acceleration sensor is increased. Accordingly, the estimated value is determined such that higher priority is given to the observable, with the result that the effect of the basic model is reduced. Thus, the estimated value is likely to be affected by sensor noise. Further, in this case, the estimated convergence rate becomes higher.

(B) A Case where the Observer Gain K is Small (Pole is Close to Real Axis)

In this case, the observable which is an input of the acceleration sensor is greatly smoothed. In other words, the effect of the observable is reduced. Accordingly, the estimated value basically follows the basic model. As a result, the estimated value is hardly affected by the sensor noise. Further, in this case, the estimated convergence rate becomes lower.

The observer gain K is set such that the high frequency component of the tilt angle, which is estimated based on the gyro sensor, is output as it is and such that the low frequency range and direct current components are set so as to obtain the tilt angle estimated based on the acceleration sensor, whereby the tilt angle can be estimated with high accuracy in a wide frequency range from the direct current component to the high frequency range.

Since the external force observer employed in the present invention is provided so as to estimate the direct current component of the tilt angle, there is no problem if a response thereof is slow. A slower response indicates that noise can be further reduced, so the estimation with high accuracy is expected. Further, since the observer which is slow in response is employed, the pole is set to be relatively close to the real axis.

In the present invention, as described above, the equation of motion (model information) corresponding to the tilt angle is used as the external force observer. Based on the model information and the angular velocity detected by the single-axis gyro sensor, the tilt angle is estimated with high accuracy in the medium to high frequency range. Further, in the present invention, the tilt angle estimated based on the biaxial acceleration sensor as well as the single-axis gyro sensor is set as a reference value for the observer, and feedback control is executed so that the estimated value follows the reference value. As a result, the tilt angle can be estimated with high accuracy in a wide frequency range from the direct current component to the high frequency range. Furthermore, the effect of noise of the acceleration sensor can be reduced by appropriately setting the observer gain K.

The external force observer of a continuous system as ultimately designed is discretized, thereby making it possible to design the external force observer.

Figure 3:
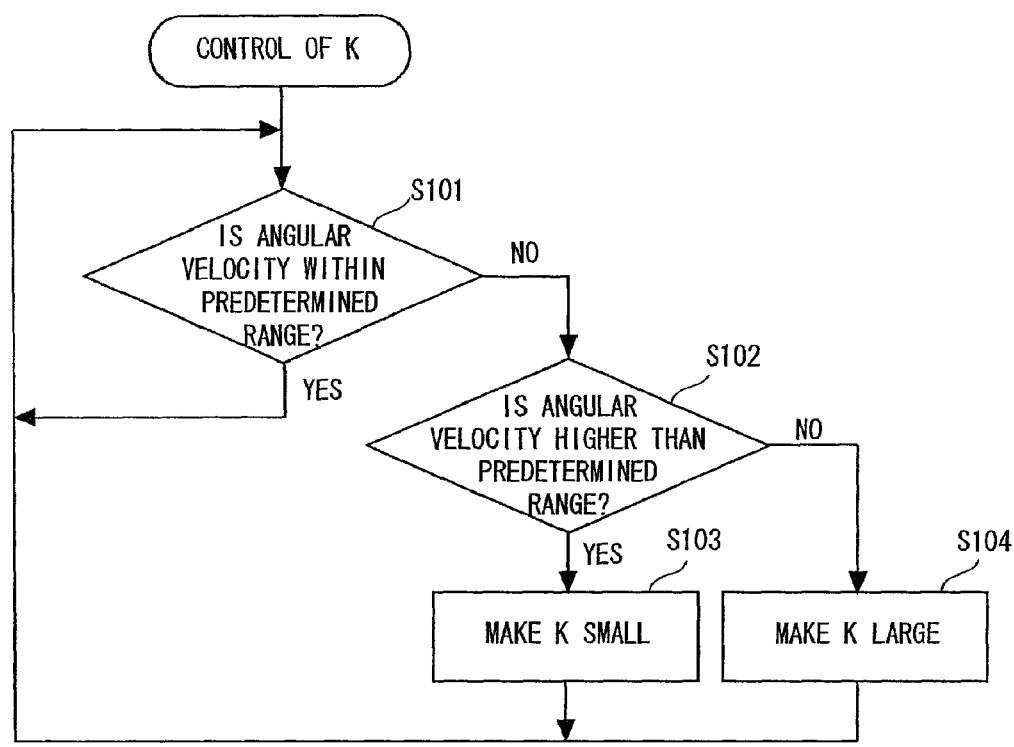
FIG. 3 is a flowchart showing the method of estimating a tilt angle of a moving body according to the embodiment of the present invention.
Figure 4:
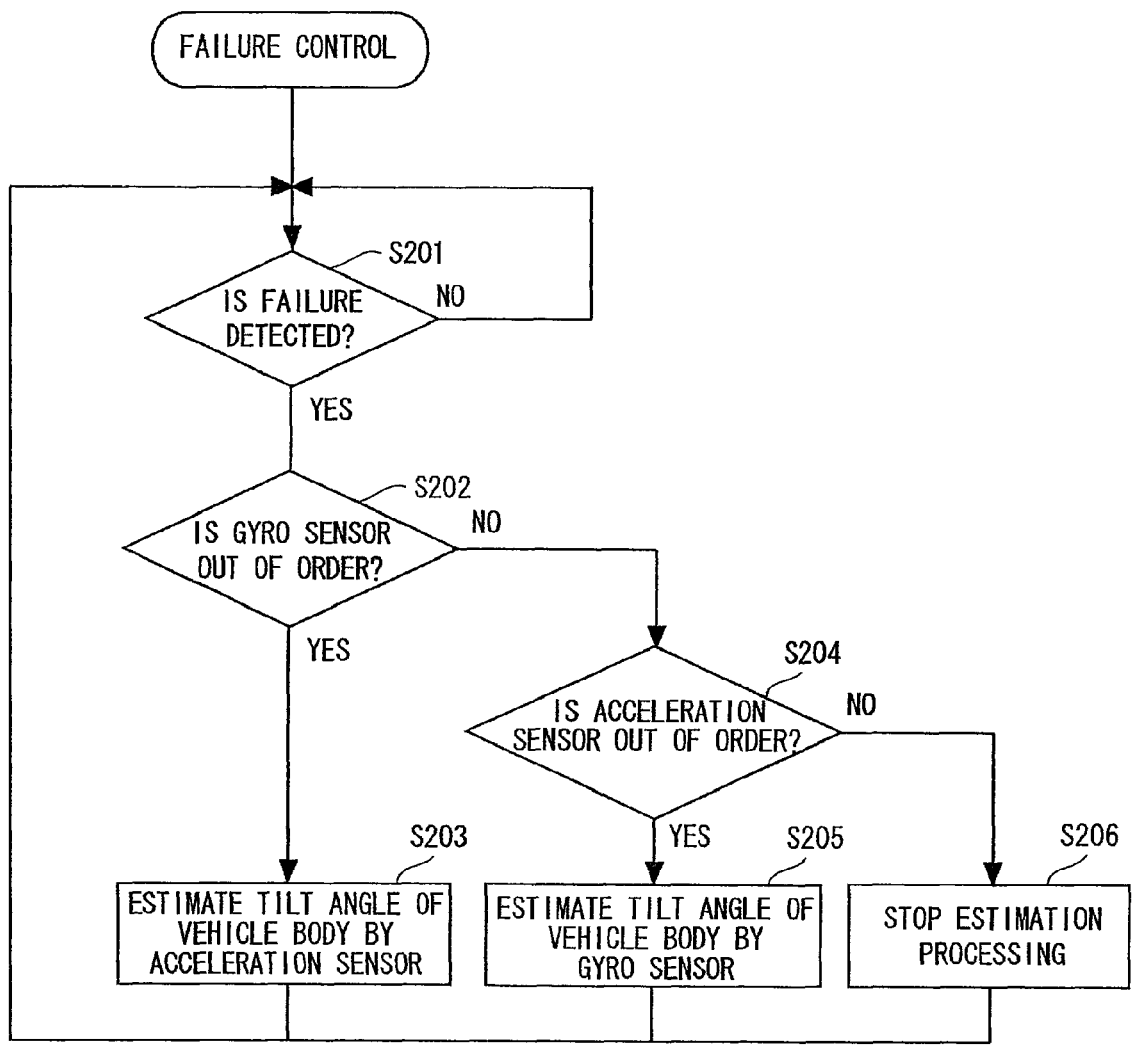
FIG. 4 is a flowchart showing the method of estimating a tilt angle of a moving body according to the embodiment of the present invention.

Further, in the present invention, the control of the observer gain K is executed by a control mechanism. FIG. 3 shows a flowchart of the control. First, the control mechanism determines whether the angular velocity detected by the gyro sensor or the like is within a predetermined range (S101). Here, the angular velocity is set as a reference because it is possible to detect whether the moving body is in the longitudinal acceleration state. Accordingly, in the example shown in FIG. 3, it is detected whether the moving body is in the longitudinal acceleration state based on the angular velocity. However, the present invention is not limited thereto, and it may be detected whether the moving body is in the longitudinal acceleration state based on another parameter. When determining that the angular velocity is within the predetermined range, the control mechanism does not execute the control for changing the value of the observer gain K.

Next, when determining that the angular velocity is not within the predetermined range, that is, out of the predetermined range, the control mechanism further determines whether the angular velocity is higher than the predetermined range (S102). As a result of the determination, when determining that the angular velocity is higher than the predetermined range, the control mechanism executes control for making the value of the observer gain K small (S103). Thus, the moving body is in the longitudinal acceleration state and is in a state where disturbance noise is more likely to occur in the acceleration sensor, so the effect on the acceleration sensor can be reduced.

As a result of the determination, when determining that the angular velocity is not higher than the predetermined range, that is, lower than the predetermined range, the control mechanism executes control for making the value of the observer gain K large (S104). Note that the magnitude of the value of the observer gain K may be controlled by selecting one of an output value obtained when the estimation processing is executed by making the observer gain K small, and an output value obtained when the estimation processing is executed by making the observer gain K large.

Next, a description is given of a failure control for the sensors. Though the gyro sensor and the acceleration sensor are provided in the present invention, when one of the sensors is out of order, control is executed such that the tilt angle estimation is not carried out based on the sensor that is out of order, that is, such that the tilt angle estimation is carried out based on only the sensor that is not out of order.

Specifically, the control mechanism determines whether a failure such as disconnection or a sensor failure is detected by a watchdog or the like (S201). When determining that the failure is detected, the control mechanism determines whether the gyro sensor is out of order (S202). When determining that the gyro sensor is out of order, the control mechanism estimates the tilt angle of the vehicle body by using the acceleration sensor that is not out of order (S203). Meanwhile, when determining that the gyro sensor is not out of order, the control mechanism determines that the acceleration sensor is out of order (S204). As a result of the determination, when determining that the acceleration sensor is out of order, the control mechanism estimates the tilt angle of the vehicle body by using the gyro sensor that is not out of order (S205). When determining that the acceleration sensor is not out of order, the control mechanism stops the estimation processing (S206).

Further, in the present invention, the use of model information of the moving body enables improvement of the accuracy of estimating the tilt angle. For example, in a case where the tilt angle is smaller than a predetermined value due to restrictions on the structure of a vehicle, the estimation processing is executed by limiting the estimated value to the predetermined value when the estimated value exceeds the predetermined value, whereby a deviation between the true value and the estimated value is limited. As a result, it is possible to prevent degradation of the estimation accuracy.

Note that, in the above-mentioned example, the moving body 10 is an inverted two-wheeled unstable vehicle, but the present invention is not limited thereto. A walking type moving body or a caterpillar-driven moving body may be employed. Further, the moving body 10 can be applied to a boarding-type moving body, a moving body incorporated into the lower body of a robot, and a moving body that moves while carrying a load.

INDUSTRIAL APPLICABILITY

The present invention relates to a moving body with a tilt angle estimating mechanism, and more particularly, the present invention is widely applicable to an inverted two-wheeled vehicle with a tilt angle estimating mechanism.

The invention claimed is:

1. A moving body, comprising:
an acceleration sensor for detecting an acceleration in two axial directions;
a gyro sensor for detecting an angular velocity of a vehicle body; and
a tilt angle estimating mechanism for estimating a tilt angle of the vehicle body,
wherein the tilt angle estimating mechanism includes:
a device for estimating a first tilt angle based on the acceleration detected by the acceleration sensor;
a device for estimating a second tilt angle based on the angular velocity detected by the gyro sensor according to a linear model equation of the moving body; and
a device for estimating a tilt angle by executing feedback control so that the second tilt angle follows the first tilt angle, with the first tilt angle being set as a reference value for an observer, wherein the moving body is an inverted two-wheeled vehicle and the feedback control is at least in part based on an external force observer that uses a value of an external force as a state quantity.

2. The moving body according to claim 1, wherein the tilt angle estimating mechanism includes a setting device for setting an observer gain K for adjusting an effect of the first tilt angle, to an arbitrary value.

3. The moving body according to claim 2, wherein the setting device sets the observer gain K to a small value when the moving body is in a longitudinal acceleration state.

4. The moving body according to claim 2, wherein the setting device sets the observer gain K according to a failure condition of each of the acceleration sensor and the gyro sensor.

5. The moving body according to claim 1, wherein the acceleration sensor includes a low-pass filter provided in a subsequent stage thereof.

6. A moving body, comprising:
an acceleration sensor detecting an acceleration in two axial directions;
a gyro sensor detecting an angular velocity of a vehicle body; and
a tilt angle estimating mechanism estimating a tilt angle of the vehicle body,
wherein the tilt angle estimating mechanism includes:
a first estimation portion estimating a first tilt angle based on the acceleration detected by the acceleration sensor;
a second estimation portion estimating a second tilt angle based on the angular velocity detected by the gyro sensor according to a linear model equation of the moving body; and
a third estimation portion estimating a tilt angle by executing feedback control so that the second tilt angle follows the first tilt angle, with the first tilt angle being set as a reference value for an observer,
wherein the moving body is an inverted two-wheeled vehicle and the feedback control is at least in part based on an external force observer that estimates a value of an external force as a state quantity.

* * * * *

UNITED STATES PATENT AND TRADEMARK OFFICE
CERTIFICATE OF CORRECTION

PATENT NO. : 8,000,925 B2
APPLICATION NO. : 12/297323
DATED : August 16, 2011
INVENTOR(S) : Toshio Fuwa et al.

It is certified that error appears in the above-identified patent and that said Letters Patent is hereby corrected as shown below:

Column  Line 5       5       Change " [illegible equation] $A\hat{P}\hat{X}=A\hat{X}+Bu+K(Y-C\hat{X})$    (10) "

to -- $\dot{\hat{X}} = A\hat{X} + Bu + K(Y - C\hat{X})$    (10) --.

Signed and Sealed this
Thirteenth Day of March, 2012

David J. Kappos
*Director of the United States Patent and Trademark Office*